(12) United States Patent
Yu et al.

(10) Patent No.: US 10,178,391 B2
(45) Date of Patent: Jan. 8, 2019

(54) METHODS AND DEVICES FOR DATA COMPRESSION USING A NON-UNIFORM RECONSTRUCTION SPACE

(71) Applicant: BLACKBERRY LIMITED, Waterloo (CA)

(72) Inventors: Xiang Yu, Waterloo (CA); Dake He, Waterloo (CA); Jing Wang, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 658 days.

(21) Appl. No.: 14/479,836

(22) Filed: Sep. 8, 2014

(65) Prior Publication Data

US 2014/0376622 A1  Dec. 25, 2014

Related U.S. Application Data

(63) Continuation of application No. 13/249,304, filed on Sep. 30, 2011.

(51) Int. Cl.
*H04N 19/154* (2014.01)
*H04N 19/196* (2014.01)
(Continued)

(52) U.S. Cl.
CPC ......... *H04N 19/154* (2014.11); *H04N 19/126* (2014.11); *H04N 19/14* (2014.11);
(Continued)

(58) Field of Classification Search
CPC .................................................. H04N 19/154
See application file for complete search history.

(56) References Cited

U.S. PATENT DOCUMENTS 6,163,575 A   12/2000   Nieweglowski et al.
6,212,235 B1   4/2001   Nieweglowski et al.
(Continued)

FOREIGN PATENT DOCUMENTS

CA   2798354   11/2011
EP    550012    7/1993
(Continued)

OTHER PUBLICATIONS

Canadian Office Action dated Apr. 12, 2016, CA2,848,848.
(Continued)

*Primary Examiner* — Tung T Vo
*Assistant Examiner* — Rowina J Cattungal
(74) *Attorney, Agent, or Firm* — Rowand LLP

(57) ABSTRACT

An encoding method for encoding video data by adjusting a quantization parameter, the video data being partitioned into blocks comprising sets of quantized transform coefficients. The method includes, for a set of quantized transform coefficients corresponding to one of the blocks, collecting statistics, wherein the statistics comprise the number of quantized transform coefficients and the sum of the non-rounded quantization value of the quantized transform coefficients in the set. The method also includes deriving a step size based on the statistics, mapping the derived step size to a closest quantization parameter value, and quantizing a next block using the mapped quantization parameter value.

15 Claims, 9 Drawing Sheets

(51) Int. Cl.

| | |
|---|---|
| *H04N 19/70* | (2014.01) |
| *H04N 19/147* | (2014.01) |
| *H04N 19/463* | (2014.01) |
| *H04N 19/126* | (2014.01) |
| *H04N 19/14* | (2014.01) |
| *H04N 19/186* | (2014.01) |
| *H04N 19/625* | (2014.01) |

(52) U.S. Cl.
CPC ......... *H04N 19/147* (2014.11); *H04N 19/186* (2014.11); *H04N 19/197* (2014.11); *H04N 19/463* (2014.11); *H04N 19/625* (2014.11); *H04N 19/70* (2014.11)

(56) References Cited

U.S. PATENT DOCUMENTS

| | | |
|---|---|---|
| 6,507,617 B1 | 1/2003 | Karczewicz et al. |
| 6,526,096 B2 | 2/2003 | Lainema et al. |
| 6,690,307 B2 | 2/2004 | Karczewicz |
| 6,696,993 B2 | 2/2004 | Karczewicz |
| 6,711,209 B1 | 3/2004 | Lainema et al. |
| 6,724,944 B1 | 4/2004 | Kalevo et al. |
| 6,735,249 B1 | 5/2004 | Karczewicz et al. |
| 6,738,423 B1 | 5/2004 | Lainema et al. |
| 6,741,648 B2 | 5/2004 | Karczewicz et al. |
| 6,765,963 B2 | 7/2004 | Karczewicz et al. |
| 6,795,584 B2 | 9/2004 | Karczewicz et al. |
| 6,856,701 B2 | 2/2005 | Karczewicz et al. |
| 6,879,268 B2 | 4/2005 | Karczewicz |
| 6,907,142 B2 | 6/2005 | Kalevo et al. |
| 6,920,175 B2 | 7/2005 | Karczewicz et al. |
| 6,925,119 B2 | 8/2005 | Bartolucci et al. |
| 6,950,469 B2 | 9/2005 | Karczewicz et al. |
| 7,149,251 B2 | 12/2006 | Karczewicz et al. |
| 7,161,983 B2 | 1/2007 | Laineman et al. |
| 7,200,174 B2 | 4/2007 | Lainema et al. |
| 7,242,815 B2 | 7/2007 | Kalevo et al. |
| 7,280,599 B2 | 10/2007 | Karczewicz et al. |
| 7,289,674 B2 | 10/2007 | Karczewicz |
| 7,295,713 B2 | 11/2007 | Kalevo et al. |
| 7,336,837 B2 | 2/2008 | Ridge et al. |
| 7,388,996 B2 | 6/2008 | Lainema et al. |
| 7,477,689 B2 | 1/2009 | Karczewicz et al. |
| 7,567,719 B2 | 7/2009 | Kalevo et al. |
| 7,664,176 B2 | 2/2010 | Baa et al. |
| 7,706,447 B2 | 4/2010 | Karczewicz et al. |
| 7,756,206 B2 | 7/2010 | Ridge et al. |
| 7,792,193 B2 | 9/2010 | Tanizawa et al. |
| 8,036,273 B2 | 10/2011 | Karczewicz et al. |
| 2004/0101058 A1* | 5/2004 | Sasai ............... G06T 9/004 375/240.26 |
| 2004/0158595 A1* | 8/2004 | Cheung ............ G06F 7/535 708/490 |
| 2006/0013497 A1 | 1/2006 | Yang et al. |
| 2006/0133478 A1* | 6/2006 | Wen ............... H04N 19/176 375/240.03 |
| 2007/0147497 A1 | 6/2007 | Bao et al. |
| 2007/0217506 A1* | 9/2007 | Yang ............. H04N 19/00781 375/240.03 |
| 2008/0037880 A1* | 2/2008 | Lai ................ H04N 19/172 382/232 |
| 2008/0056347 A1* | 3/2008 | Chiu .............. H04N 19/197 375/240 |
| 2010/0014582 A1* | 1/2010 | Yoshimatsu ...... H04N 19/42 375/240.03 |
| 2010/0290524 A1* | 11/2010 | Lu .................. H04N 19/176 375/240.03 |
| 2010/0303370 A1 | 12/2010 | Yamori et al. |
| 2011/0007802 A1* | 1/2011 | Karczewicz ...... H04N 19/105 375/240.15 |

FOREIGN PATENT DOCUMENTS

| | | |
|---|---|---|
| EP | 0550012 | 7/1993 |
| JP | 2007049312 | 2/2007 |
| WO | 2010024622 | 3/2010 |

OTHER PUBLICATIONS

SIPO, CN Office Action relating to CN Application No. 201280059215.X, dated Sep. 5, 2016.
EPO, EP Examination Report relating to Application No. 11183606.0, dated Sep. 15, 2015.
CIPO, CA Office Action relating to Application No. 2,848,848, dated Apr. 15, 2015.
Wedi et al.: "Quantization with Adaptive Dead-Zone Size for H.264/AVC FRExt", JVT (Joint Collaborative Team of ISO/IEC JTC1/SC29/WG11 and ITU-T SC.16) 68. MPEG Meeting, Mar. 15-19, 2004, Munich, DE, Mar. 19, 2004, document No. JCT-K026, XP030005843.
Xiang et al.: "Quantization with Hard-decision Partition and Adaptive Reconstruction Levels for Low Delay Setting", JCT-VC (Joint Collaborative Team on Video Coding) 95. MPEG Meeting on Video Coding of ISO/IEC JTC1/SC29/WG11 and ITU-T SG.16, Jan. 20-28, 2011, Daugu, KR, 16, Jan. 2011, document No. JCTVC-D384, XP030008423.
Xiang Yu et al: "Adaptive quantization with balanced distortion distribution and its application to H.264 Intra coding" Image Processing (ICIP). 2009 16th IEEE International Conference on,IEEE, Piscataway, NJ, USA LNKD DOI:10.1109/CIP.2009.5413738, Nov. 7, 2009 (200S-11-07), pp. 1049-1052. XP031628437.
En-Hui Yang et al: "Soft Decision Quantization for H.264 With Main Profile Compatibility" IEEE Transactions on Circuits and Systems for Video Technology, IEEE Service Center, Piscataway, NJ, US LNKD 001:10 1109fTCSVT.2008.2009260, vol. 19, No. 1, Jan. 1, 2009 {Jan. 1, 2009), pp. 122-127, XP011280553.
En-Hui Yang et al: "Rate Distortion Optimization for H.264 Interframe Coding: A General Framework and Algorithms" IEEE Transactions on Image Processing, IEEE Service Center, Piscataway, NJ, US LNKD- DOI:10.1109fTIP.2007.896685, vol. 16. No. 7, Jul. 1, 2007 (Jul. 1, 2007), pp. 1774-1764, XP011185448.
Matthew Crouse et al: "Joint Thresholding and Quantizer Selection for Transform Image Coding: Entropy-Constrained Analysis and Applications to Baseline JPEG" IEEE Transactions on Image Processing, IEEE Service Center. Piscataway, NJ, US, vol. 6, No. 2, Feb. 1, 1997 (Feb. 1, 1997), XP011026108.
Jiangtao Wen et al: "Trellis-Based R-D Optimal Quantization in H.263+" IEEE Transactions on Image Processing,IEEE Service Center, Piscataway, NJ, US. vol. 9, No. 8,Aug. 1, 2000 (Aug. 1, 2000), XP011025644.
Extended European Search Report dated Oct. 14, 2010.
T. Wiegand and G. J. Sullivan and A. Luthra, ITU-T Rec. H.264/ISOIIEC 14496-10 AVC, Joint Video Team of ISO/IEC MPEG and ITU-T VCEG.
E.-h. Yang and X. Yu, On joint optimization of motion compensation, quantization and baseline entropy coding in H.264 w1th complete decoder compatibility, Proceedings of IEEE International Conference on Acoustics, Speech, and Signal Processing, pp. II325-II328, Mar. 2005.
E.-h. Yang and X. Yu. Rate Distortion Optimization of H.264 with Main Profile Compatibility, IEEE International Symposium on Information Theory, pp. 282-286, Jul. 2006.
S. Lloyd, "Least Squares Quantization in PCM". IEEE Trans. on Information Theory, vol. IT-28, No. 2, pp. 129-137, Mar. 1982.
H.R Malvar, A. Hallapuro, M. Karczewicz, L Kerofsky, "Low-complexity transform and quantization in H.264/AVC," IEEE Transactions on Circuits and Systems for Video Technology, vol. 13, Issue 7, pp. 598-603, Jul. 2003.
A. Tanizawa, T. Chujoh, "Simulation results of Adaptive Quantization Matrix Selection on KTA software," ITU- SG16/Q6, Document VCEG-AC07, Klagenfurt, Austria, Jul. 17-18, 2006.

(56) References Cited

OTHER PUBLICATIONS

Xiang Li, et al., "CE4 Subtest3: Adaptive De-Quantization Offset", Joint Collaboration Team on Video Coding (JCT-VC) of ITU-T SG16 WP3 and ISO/IEC JTC1/SC29/WG11, JCTVC-F119.

Xianglin Wang, et al., "Fine Granularity QP Change at Slice Level", Joint Collaboration Team on Video Coding (JCT-VC) of ITU-T SG16 WP3 and ISO/IEC JTC1/SC29/WG11, JCTVC-F610.

Thomas Wedi, et al., "Rate-Distortion Constrained Estimation of Quantization Offsets", Joint Video Team (JVT) of ISO/IEC MPEG & ITU-T VCEG (ISO/IEC JTC1/SC29/WG11 and ITU-T-SG16 Q.6), JVT-O066.

EPO, Extended European Search Report relating to application No. 11183606.0 dated Nov. 24, 2011.

WEDI: "Quantization with Adaptive Dead-Zone Size", 11. JVT Meeting; 68. MPEG Meeting; Mar. 15, 2004-Mar. 19, 2004; Munich, DE; (Joint Video Team of ISO/IEC JTC1/SC29/WG11 and ITU-T SG.16) No. JVT-K026, Mar. 19, 2004 XP030005843, ISSN: 0000-0421 *section 3*.

Xiang Yu et al: "Quantization with Hard-Decision Partition and Adaptive Reconstruction Levels for Low Delay Setting", 4. JCT-VC Meeting; 95. MPEG Meeting; Jan. 20, 2011-Jan. 28, 2011; Daegu; (Joint Collaborative Team on Video Coding of ISO/IEC JTC1/SC29/WG11 and ITU-T SG.16); URL: http://wftp3.itu.int/av-arch/jctvc-site/, No. JCTVC-D384, Jan. 16, 2011, XP030008423, ISSN: 0000-0013 *section 2*.

Jing Wang et al: "Hard-decision quantization with adaptive reconstruction levels for High Efficiency Video Coding", Information Theory (CWIT), 2011 12th Canadian Workshop ON, IEEE, May 17, 2011, pp. 62-65, XP031944038, DOI: 10.1109/CWIT. 2011. 5872124 ISBN: 978-1-4577-0743-8 *section III*.

International Search Report dated Nov. 16, 2011, PCT/CA2011/050350.

Fischer, "A Pyramid Vector Quantizer", IEEE Transactions on Information Theory, vol. IT-32, No. 4, pp. 568-583, Jul. 1986 (Jul. 1986).

International Search Report and Written Opinion dated Jan. 2, 2013, PCT/CA2012/050685.

USPTO, U.S. Office Action relating to U.S. Appl. No. 13/155,616, dated Nov. 27, 2013USPTO, U.S. Office Action relating to U.S. Appl. No. 13/155,616, dated Nov. 27, 2013.

USPTO, U.S. Office Action relating to U.S. Appl. No. 13/155,616, dated Nov. 27, 2013.

EP Office Action dated Sep. 14, 2017, Application No. 11183606.0.

SIPO, CN Office Action relating to CN application No. 201280059215X, dated Apr. 12, 2017.

\* cited by examiner

METHODS AND DEVICES FOR DATA COMPRESSION USING A NON-UNIFORM RECONSTRUCTION SPACE

REFERENCE TO RELATED APPLICATIONS

The present application is a continuation of U.S. patent application Ser. No. 13/249,304, filed Sep. 30, 2011, the contents of which are hereby incorporated by reference.

COPYRIGHT NOTICE

A portion of the disclosure of this document and accompanying materials contains material to which a claim for copyright is made. The copyright owner has no objection to the facsimile reproduction by anyone of the patent document or the patent disclosure, as it appears in the Patent and Trademark Office files or records, but reserves all other copyright rights whatsoever.

FIELD

The present application generally relates to data compression and, in particular, to methods and devices for quantization using a non-uniform reconstruction space.

BACKGROUND

Data compression occurs in a number of contexts. It is very commonly used in communications and computer networking to store, transmit, and reproduce information efficiently. It finds particular application in the encoding of images, audio and video. Video presents a significant challenge to data compression because of the large amount of data required for each video frame and the speed with which encoding and decoding often needs to occur. The current state-of-the-art for video encoding is the ITU-T H.264/AVC video coding standard. It defines a number of different profiles for different applications, including the Main profile, Baseline profile and others. A next-generation video encoding standard is currently under development through a joint initiative of MPEG-ITU: High Efficiency Video Coding (HEVC).

There are a number of standards for encoding/decoding images and videos, including H.264, that uses block-based coding processes. In these processes, the image or frame is divided into blocks, typically 4×4 or 8×8, and the blocks are spectrally transformed into coefficients, quantized, and entropy encoded. In many cases, the data being transformed is not the actual pixel data, but is residual data following a prediction operation. Predictions can be intra-frame, i.e. block-to-block within the frame/image, or inter-frame, i.e. between frames (also called motion prediction). It is expected that HEVC will also have these features.

When spectrally transforming residual data, many of these standards prescribe the use of a discrete cosine transform (DCT) or some variant thereon. The resulting DCT coefficients are then quantized using a quantizer that employs a uniform quantization step size, i.e. a uniform partitioning of the data space.

Work in lossy compression, e.g., audio/voice coding, video coding, image coding, etc., tends to focus on improving rate-distortion performance. That is, the objective of most encoding and decoding schemes is to find an optimal balance between distortion and coding rate. A rate-distortion optimization expression of the type $J=D+\lambda R$ is typically used, wherein the Lagrangian multiplier $\lambda$ represents the desired trade-off between coding rate and distortion.

The reconstruction of the data at a decoder using a uniform reconstruction space that matches the uniform partitioning of the data space by quantization at the encoder does not always realize an optimal rate-distortion performance.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
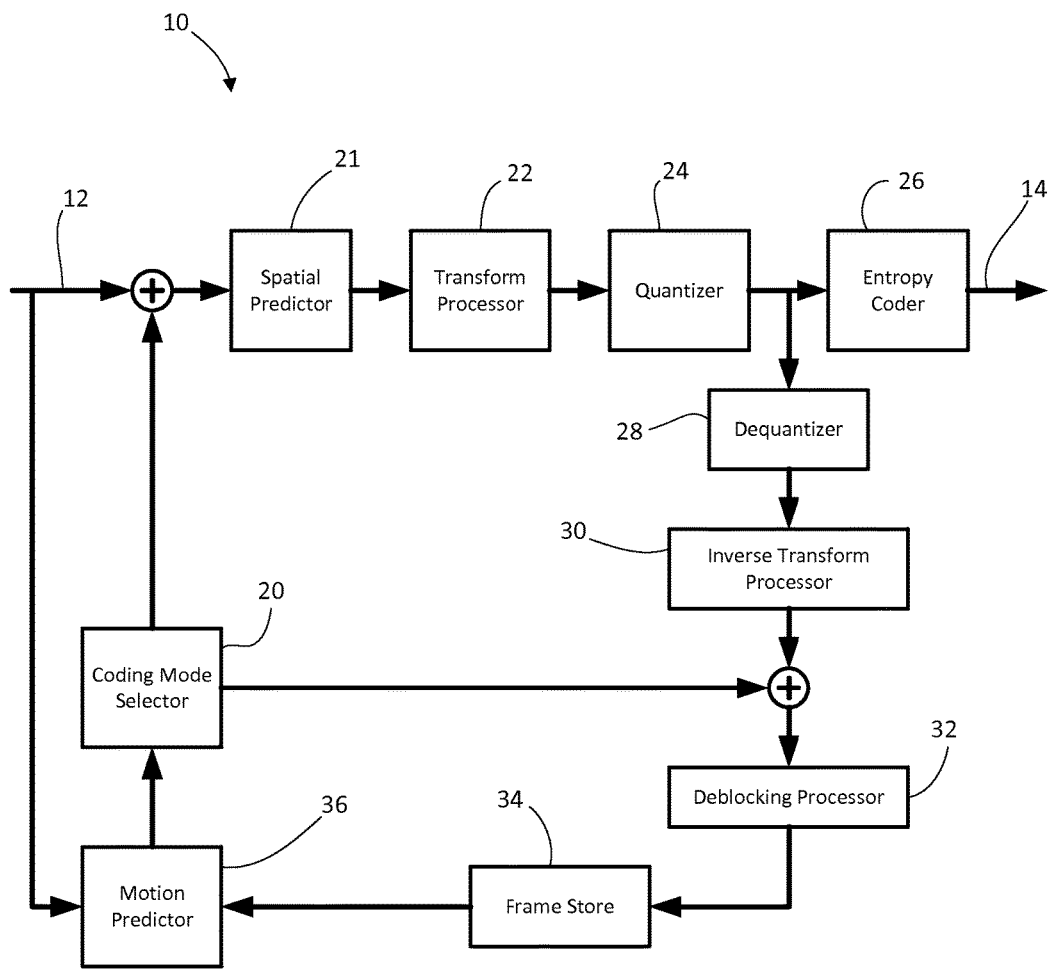
FIG. 1 shows, in block diagram form, an encoder for encoding video.

The present application describes methods and encoders/decoders for achieving rate-distortion improvements in lossy data compression. In some embodiments, the data compression process or devices described herein may be applied to the encoding and decoding of audio data, image data, and/or video data. In particular, the present application describes a method and process of data compression that uses a non-uniform reconstruction space for dequantization. Methods and devices are described for determining a non-uniform reconstruction space at an encoder, communicating the parameters for non-uniform reconstruction to a decoder, and application of the non-uniform reconstruction space at the decoder when dequantizing data.

In one aspect, the present application describes a method of decoding a bitstream of encoded data. The method includes extracting reconstruction space parameters from the bitstream, wherein the reconstruction space parameters identify a first reconstruction level and a reconstruction step size for further reconstruction levels, and wherein the first reconstruction level is not equal to the reconstruction step size; decoding the encoded data to obtain a plurality of quantized transform coefficients; and dequantizing each quantized transform coefficient to generate a reconstructed transform coefficient based on the first reconstruction level and the reconstruction step size.

In another aspect, the present application describes a method for encoding data, the data including quantized transform domain coefficients. The method includes generating reconstruction space parameters based upon the quantized transform domain coefficients, wherein the reconstruction space parameters identify a first reconstruction level and a reconstruction step size for further reconstruction levels, and wherein the first reconstruction level is not equal to the reconstruction step size; entropy encoding the quantized transform domain coefficients; and generating a bitstream containing the encoded quantized transform domain coefficients and the reconstruction space parameters.

In yet another aspect, the present application provides a method for encoding video data by adjusting a quantization parameter, the video data being partitioned into blocks comprising sets of quantized transform coefficients. The method includes, for a set of quantized transform coefficients corresponding to one of the blocks, collecting statistics, wherein the statistics comprise the number of quantized transform coefficients and the sum of the non-rounded quantization value of the quantized transform coefficients in the set. The method further includes deriving a step size based on the statistics, mapping the derived step size to a closest quantization parameter value, and quantizing a next block using the mapped quantization parameter value.

In a further aspect, the present application describes encoders and decoders configured to implement such methods of encoding and decoding.

In yet a further aspect, the present application describes non-transitory computer-readable media storing computer-executable program instructions which, when executed, configured a processor to perform the described methods of encoding and/or decoding.

Other aspects and features of the present application will be understood by those of ordinary skill in the art from a review of the following description of examples in conjunction with the accompanying figures.

In the description that follows, some example embodiments are described with reference to the H.264 standard for video coding. Those ordinarily skilled in the art will understand that the present application is not limited to H.264 but may be applicable to other video coding/decoding standards, including possible future standards, such as HEVC, multi-view coding standards, scalable video coding standards, and reconfigurable video coding standards. It will also be appreciated that the present application is not necessarily limited to video coding/decoding and may be applicable to audio coding/decoding, image coding/decoding, or the lossy coding/decoding of any other data. The present application is broadly applicable to any lossy data compression process that employs quantization irrespective of the type of data being coded/decoded.

In the description that follows, when referring to video or images the terms frame, slice, tile and rectangular slice group may be used somewhat interchangeably. Those of skill in the art will appreciate that, in the case of the H.264 standard, a frame may contain one or more slices. It will also be appreciated that certain encoding/decoding operations are performed on a frame-by-frame basis, some are performed on a slice-by-slice basis, some tile-by-tile, and some by rectangular slice group, depending on the particular requirements of the applicable image or video coding standard. In any particular embodiment, the applicable image or video coding standard may determine whether the operations described below are performed in connection with frames and/or slices and/or tiles and/or rectangular slice groups, as the case may be. Accordingly, those ordinarily skilled in the art will understand, in light of the present disclosure, whether particular operations or processes described herein and particular references to frames, slices, tiles, rectangular slice groups are applicable to frames, slices, tiles, rectangular slice groups, or some or all of those for a given embodiment. This also applies to coding units, groups of coding units, etc., as will become apparent in light of the description below.

In the discussion that follows, reference is made to DCT coefficients and the DCT domain; however, it will be appreciated that this application is not limited to the encoding of DCT coefficients, the encoding of block-based transform coefficients, the encoding of block-based data, or any particular data type.

To the extent that the processes or methods described below are applied to images and/or video they may be applied to a portion of a video or image, such as a frame, a slice, a Group-of-Pictures (GOP), or on any other basis, such as to a coding unit, or group of coding units. To the extent that the process or methods described herein are applied to audio, such as music or voice data, they may be applied to a grouping or sequence of data points, e.g. an audio sample. It should be noted that the terms picture and frame could be used interchangeably.

Figure 2:
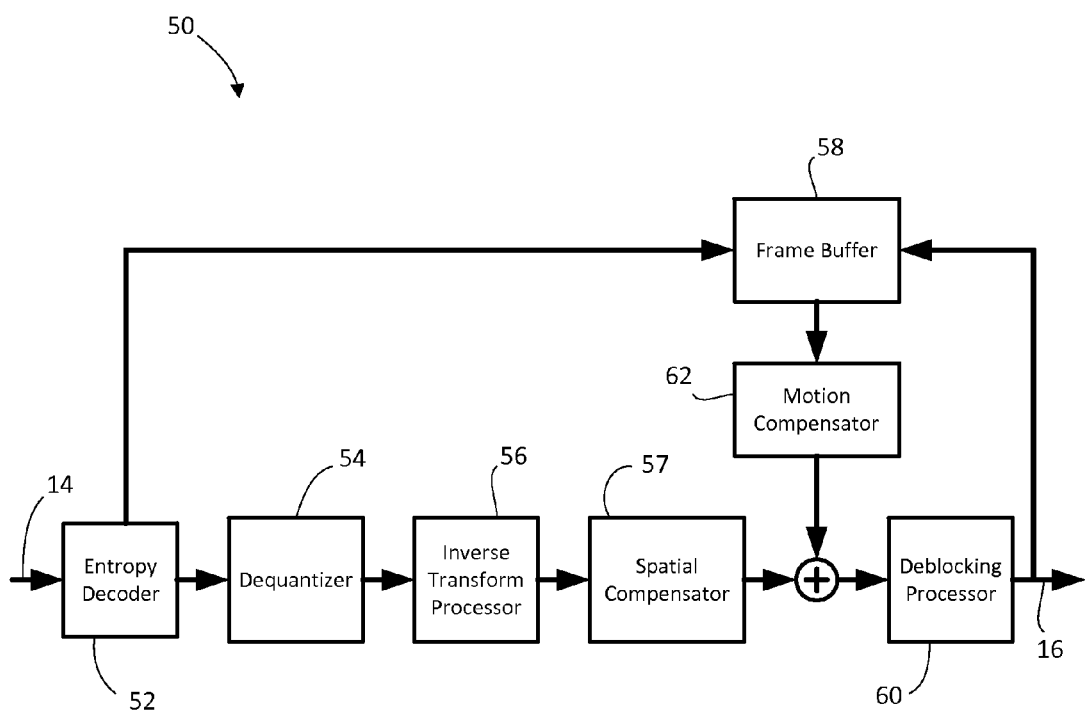
FIG. 2 shows, in block diagram form, a decoder for decoding video.

Reference is now made to FIG. 1, which shows, in block diagram form, an encoder 10 for encoding video. Reference is also made to FIG. 2, which shows a block diagram of a decoder 50 for decoding video. It will be appreciated that the encoder 10 and decoder 50 described herein may each be implemented on an application-specific or general purpose computing device, containing one or more processing elements and memory. The operations performed by the encoder 10 or decoder 50, as the case may be, may be implemented by way of application-specific integrated circuit, for example, or by way of stored program instructions executable by a general purpose processor. The device may include additional software, including, for example, an operating system for controlling basic device functions. The range of devices and platforms within which the encoder 10 or decoder 50 may be implemented will be appreciated by those ordinarily skilled in the art having regard to the following description.

The encoder 10 receives a video source 12 and produces an encoded bitstream 14. The decoder 50 receives the encoded bitstream 14 and outputs a decoded video frame 16. The encoder 10 and decoder 50 may be configured to operate in conformance with a number of video compression standards. For example, the encoder 10 and decoder 50 may be H.264/AVC compliant. In other embodiments, the encoder 10 and decoder 50 may conform to other video compression standards, including evolutions of the H.264/AVC standard, like HEVC.

The encoder 10 includes a spatial predictor 21, a coding mode selector 20, transform processor 22, quantizer 24, and entropy encoder 26. As will be appreciated by those ordinarily skilled in the art, the coding mode selector 20 determines the appropriate coding mode for the video source, for example whether the subject frame/slice is of I, P, or B type, and whether particular coding units (e.g. macroblocks) within the frame/slice are inter or intra coded. The transform processor 22 performs a transform upon the spatial domain data. In particular, the transform processor 22 applies a block-based transform to convert spatial domain data to spectral components. For example, in many embodiments a discrete cosine transform (DCT) is used. Other transforms, such as a discrete sine transform or others may be used in some instances. The block-based transform is performed on a macroblock or sub-block basis, depending on the size of the macroblocks. In the H.264 standard, for example, a typical 16×16 macroblock contains sixteen 4×4 transform blocks and the DCT process is performed on the 4×4 blocks. In some cases, the transform blocks may be 8×8, meaning there are four transform blocks per macroblock. In yet other cases, the transform blocks may be other sizes. In some cases, a 16×16 macroblock may include a non-overlapping combination of 4×4 and 8×8 transform blocks.

Applying the block-based transform to a block of pixel data results in a set of transform domain coefficients. A "set" in this context is an ordered set in which the coefficients have coefficient positions. In some instances the set of transform domain coefficients may be considered a "block" or matrix of coefficients. In the description herein the phrases a "set of transform domain coefficients" or a "block of transform domain coefficients" are used interchangeably and are meant to indicate an ordered set of transform domain coefficients.

The set of transform domain coefficients is quantized by the quantizer 24. The quantized coefficients and associated information are then encoded by the entropy encoder 26.

Intra-coded frames/slices (i.e. type I) are encoded without reference to other frames/slices. In other words, they do not employ temporal prediction. However intra-coded frames do rely upon spatial prediction within the frame/slice, as illustrated in FIG. 1 by the spatial predictor 21. That is, when encoding a particular block the data in the block may be compared to the data of nearby pixels within blocks already encoded for that frame/slice. Using a prediction algorithm, the source data of the block may be converted to residual data. The transform processor 22 then encodes the residual data. H.264, for example, prescribes nine spatial prediction modes for 4×4 transform blocks. In some embodiments, each of the nine modes may be used to independently process a block, and then rate-distortion optimization is used to select the best mode.

The H.264 standard also prescribes the use of motion prediction/compensation to take advantage of temporal prediction. Accordingly, the encoder 10 has a feedback loop that includes a de-quantizer 28, inverse transform processor 30, and deblocking processor 32. These elements mirror the decoding process implemented by the decoder 50 to reproduce the frame/slice. A frame store 34 is used to store the reproduced frames. In this manner, the motion prediction is based on what will be the reconstructed frames at the decoder 50 and not on the original frames, which may differ from the reconstructed frames due to the lossy compression involved in encoding/decoding. A motion predictor 36 uses the frames/slices stored in the frame store 34 as source frames/slices for comparison to a current frame for the purpose of identifying similar blocks. Accordingly, for macroblocks to which motion prediction is applied, the "source data" which the transform processor 22 encodes is the residual data that comes out of the motion prediction process. For example, it may include information regarding the reference frame, a spatial displacement or "motion vector", and residual pixel data that represents the differences (if any) between the reference block and the current block. Information regarding the reference frame and/or motion vector may not be processed by the transform processor 22 and/or quantizer 24, but instead may be supplied to the entropy encoder 26 for encoding as part of the bitstream along with the quantized coefficients.

Those ordinarily skilled in the art will appreciate the details and possible variations for implementing H.264 encoders.

The decoder 50 includes an entropy decoder 52, dequantizer 54, inverse transform processor 56, spatial compensator 57, and deblocking processor 60. A frame buffer 58 supplies reconstructed frames for use by a motion compensator 62 in applying motion compensation. The spatial compensator 57 represents the operation of recovering the video data for a particular intra-coded block from a previously decoded block.

The bitstream 14 is received and decoded by the entropy decoder 52 to recover the quantized coefficients. Side information may also be recovered during the entropy decoding process, some of which may be supplied to the motion compensation loop for use in motion compensation, if applicable. For example, the entropy decoder 52 may recover motion vectors and/or reference frame information for inter-coded macroblocks.

The quantized coefficients are then dequantized by the dequantizer 54 to produce the transform domain coefficients, which are then subjected to an inverse transform by the inverse transform processor 56 to recreate the "video data". It will be appreciated that, in some cases, such as with an intra-coded macroblock, the recreated "video data" is the residual data for use in spatial compensation relative to a previously decoded block within the frame. The spatial compensator 57 generates the video data from the residual data and pixel data from a previously decoded block. In other cases, such as inter-coded macroblocks, the recreated "video data" from the inverse transform processor 56 is the residual data for use in motion compensation relative to a reference block from a different frame. Both spatial and motion compensation may be referred to herein as "prediction operations".

The motion compensator 62 locates a reference block within the frame buffer 58 specified for a particular inter-coded macroblock. It does so based on the reference frame information and motion vector specified for the inter-coded macroblock. It then supplies the reference block pixel data for combination with the residual data to arrive at the reconstructed video data for that macroblock.

A deblocking process may then be applied to a reconstructed frame/slice, as indicated by the deblocking processor 60. After deblocking, the frame/slice is output as the decoded video frame 16, for example for display on a display device. It will be understood that the video playback machine, such as a computer, set-top box, DVD or Blu-Ray player, and/or mobile handheld device, may buffer decoded frames in a memory prior to display on an output device.

It is expected that HEVC-compliant encoders and decoders will have many of these same or similar features.

Quantization

For a given block of pixels x with a prediction p, the residual is $z=x-p$. The residual z is transformed (for example by using a DCT) to generate the set of transform domain coefficients c. The coefficients c are quantized using a selected quantization step size q to produce a set of quantized coefficients u. This may be expressed as:

$$u = \text{round}(c/q + f) \quad (1)$$

where an input c is quantized to a by applying the quantization step size q, and $1 > f > 0$ is a rounding offset. Because the quantization output is calculated by a deterministic function, this is also called hard-decision quantization.

The quantization operation can be viewed from a rate-distortion point-of-view. In fact, the quantization operation can be refined so as to select indices u such that the selected indices result in a minimum rate-distortion cost. The minimum rate-distortion cost may be expressed as follows:

$$\min_u |c - u \cdot q|^2 + \lambda \cdot r(u) \qquad (2)$$

In Equation (2), c is the matrix of transform coefficients, q is the quantization step size, and a is the corresponding matrix of indices to which the coefficients have been quantized. The symbol λ is the Lagrangian multiplier, a constant that is determined by end users based on their preference of the coding rate and the video quality. A relatively small λ puts more preference on better quality, while a larger λ emphasizes on a lower coding rate. r(u) represents the rate function by entropy coding for the indices u. The entropy coding may be any suitable or applicable entropy coding scheme. In the case of JPEG images, for example, the coding may be Huffman coding. In the case of H.264 video, the coding may be CAVLC or CABAC coding. Yet other context-dependent or context-independent coding schemes may be applicable in particular embodiments. Clearly, the quantization output from Equation (2) is not given by a deterministic function anymore, but is the output of an optimization process that relates to both the rate and the distortion. Thus, it is named soft-decision quantization.

Example embodiments of soft-decision quantization are described in US patent publication no. 2007/0217506 filed by Yang et al. (hereinafter "Yang"). The Yang publication describes the optimization of a given a fixed q (or more generally the matrix q, for a quantizer in which different step sizes may be used for different coefficient positions). This is termed "soft-decision quantization", since the transform domain coefficients themselves are treated as free-parameters in the rate-distortion optimization. The application of soft-decision quantization to H.264 encoding using CAVLC is described in Yang, and it may include the use of a trellis to search for a set of quantized coefficients u that result in a minimum cumulative rate-distortion for a given entropy encoding scheme. In the example described in Yang, the H.264 CAVLC encoding scheme was used for illustration.

In H.264 and in many other coding schemes the quantization step sizes are predetermined, and in a particular instance the encoder selects one of the quantization step sizes to use for quantizing a particular set of data points, whether a block, slice, frame, etc. The encoder then only needs to transmit an index or indicator so as to inform the decoder which quantization step size was used.

Figure 3:
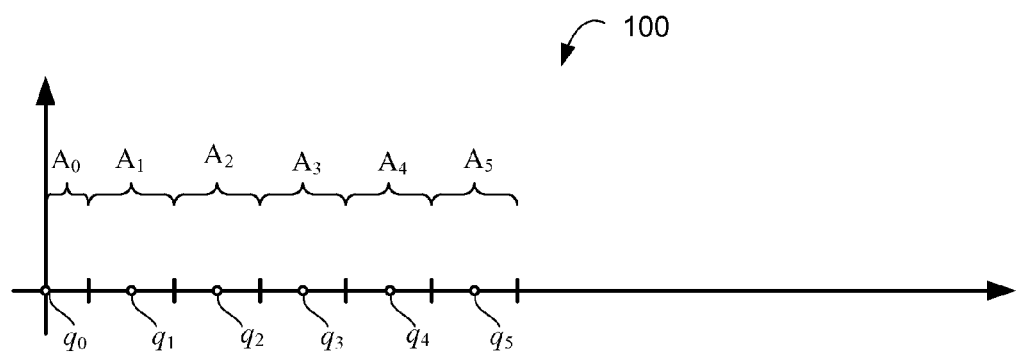
FIG. 3 shows an example data space.

Reference is now made to FIG. 3, which graphically illustrates a portion of a data space 100. In this example, the data space 100 contains the set of data points to be quantized using a selected quantization scheme. Conceptually, in order to perform quantization, the data space 100 may be considered to be partitioned into sub-parts $A_0, A_1, \ldots A_N$, where N+1 is the number of sub-parts. Each sub-part may be referenced by its index i, where i=0, 1, ..., N. A data point falling within one of the sub-parts $A_i$ is quantized as quantized transform domain coefficient u=index i. Reconstruction levels $q_u$ are at the midpoint of their respective sub-parts. When the decoder reconstructs a data point, it reconstructs it as reconstruction level $q_u$; in the case of u=i the data point is reconstructed as $q_i$ irrespective of where within the sub-part $A_i$ the actual data point was located. With a quantization step size of q, each reconstruction level $q_i$ is given by i·q. If the source data is uniform, then the assumption of a midpoint reconstruction level will result in minimal distortion; however the assumption of a uniform distribution of source data may be inaccurate in many cases.

Figure 4:
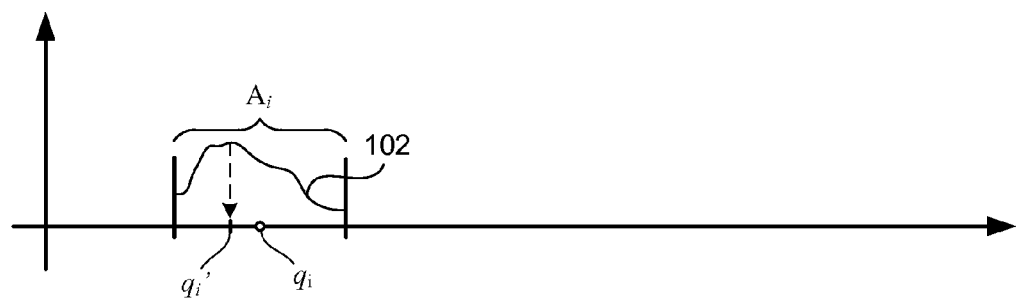
FIG. 4 shows an example non-uniform distribution of actual data within a sub-part of the data space.

Reference is now made to FIG. 4, which shows an example sub-part $A_i$. The midpoint reconstruction level is shown as $q_i$. The non-uniform distribution of the source data points is shown as reference numeral 102. It will be appreciated that data points with a distribution as shown by 102 would be better represented by an adaptive reconstruction level at or near $q_i'$. The adaptive reconstruction level may be based upon the actual distribution of data points that are associated with or assigned to the index i, i.e. that are located within the sub-part $A_i$. The adaptive reconstruction level may be based upon the arithmetic mean or median or mode, in some embodiments. By adjusting the reconstruction level to reflect the distribution of the actual data points within a sub-part $A_1$, the presently described process compensates for some of the distortion attributable to the non-uniform distribution of the data points when relying upon an assumption of uniformity.

In many data compression processes, when quantization is performed the partitioning of the data space and selection of the reconstruction levels are not considered separately. For example, in ITU-T H.264/AVC, both are subsumed under the selection of a quantization step size. The present applicants have recognized that the partitioning of the data space and the selection of a reconstruction level for each sub-part may be considered separately, and need not be based upon a pre-determined reconstruction level, for example at the midpoint of the sub-part as in ITU-T H.264/AVC.

Thus, the quantization under this process becomes a two-stage operation. First, the data points are assigned to a quantization index (i.e. based on the partitioning of the data space, the data points are grouped into sub-parts). The partitioning/quantization at this first stage may be uniform, non-uniform, predetermined hard-decision quantization, or soft-decision quantization. The step size/partition size may be selected from amongst a preset number of candidate step sizes/partition sizes based on a rate-distortion optimization process. In all these possible variations, the data points are each assigned to one of the indices for the selected quantization partition structure.

Second, the adaptive reconstruction level for one or more of the sub-parts of the partitioned data space (e.g. each index) is determined. The adaptive reconstruction level may be based upon an averaging of actual data points falling within the sub-part(s). The averaging may occur over a block or coding unit, group of blocks or coding units, slice, frame, group-of-pictures (GOP) or other suitable collection of data points given the specific application. It may also occur over a group of coding units or frames having a common quantization parameter qP. In some cases the same frame or GOP may have coding units with different qP, in which case those coding units having the same qP may be considered a group of coding units for the purpose of determining adaptive reconstruction levels for that group of coding units.

The selection of the adaptive reconstruction level for each index may be based upon a rate-distortion analysis. In other words, it may be based upon selecting a reconstruction level that minimizes the total distortion given the actual data points within the sub-part. It may further be based upon minimizing a cost function including distortion from the difference between the reconstruction level and the actual data points and the rate cost associated with transmitting the reconstruction levels. The rate cost associated with transmitting the reconstruction level may be based upon the encoding scheme used to entropy encode the reconstruction levels. The rate may also be dependent upon the mode in which the entropy coder is operating (e.g. bypass mode of CABAC).

Example processes for selecting and applying adaptive reconstruction levels were described in U.S. patent application Ser. No. 61/446,528 and Ser. No. 13/155,616, filed Feb. 25, 2011, and Jun. 8, 2011, respectively; the contents of which are hereby incorporated by reference.

Figure 5:
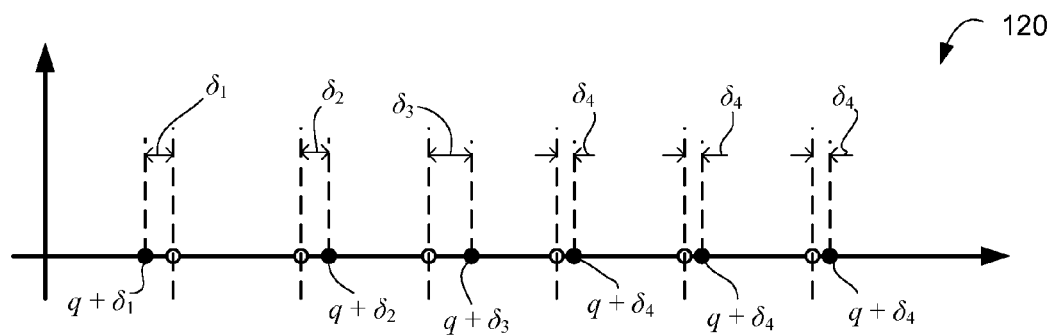
FIG. 5 shows an example adaptive reconstruction space.

One example process described in those earlier applications proposed adaptive reconstruction levels constructed in the format $i \cdot q + \delta_i$, where i is the index (also referred to herein as the quantized transform domain coefficient u), q is the quantization step size set by the quantization parameter qP, and $\delta_i$ is the offset for the $i^{th}$ quantization level. FIG. 5 graphically illustrates a reconstruction space 120 constructed in accordance with the format $i \cdot q + \delta_i$. As was described in an embodiment in U.S. application No. 61/446,528, offsets may be calculated for some of the reconstruction levels, such as the first three or four, and a common offset (perhaps selected using averaging) may be used for subsequent levels. In this example illustration, the offset $\delta_4$ is used for the fourth level and above.

Figure 6:
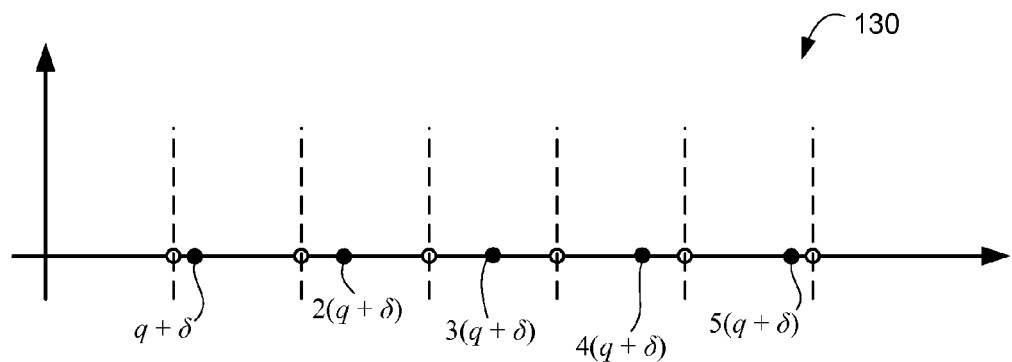
FIG. 6 shows a second example adaptive reconstruction space.

Another example process described in the earlier applications proposed adaptive reconstruction levels constructed in the format $i \cdot (q + \delta)$, where i is the index (the quantized transform domain coefficient), q is the quantization step size set by the quantization parameter qP, and $\delta$ is the offset to the quantization step size. FIG. 6 graphically illustrates a reconstruction space 130 constructed in accordance with this format. It will be noted that this format still results in a uniform reconstruction space, as each level is spaced apart by $q + \delta$.

A possible issue with the former example reconstruction space of the format $i \cdot q + \delta_i$ is the rate-distortion cost associated with transmitting all the offsets. There may also be insufficient statistics to generate sufficiently accurate offsets to justify the cost for every level. As noted, some levels may use an average offset to address this issue. A possible issue with the latter example reconstruction space of the format $i \cdot (q + \delta)$ is that the reconstruction space remains uniform, which limits the rate-distortion coding performance gains in quantization design. It will also be noted that both schemes remain based upon the quantization step size q used to quantize the transform domain coefficients at the encoder.

Figure 7:
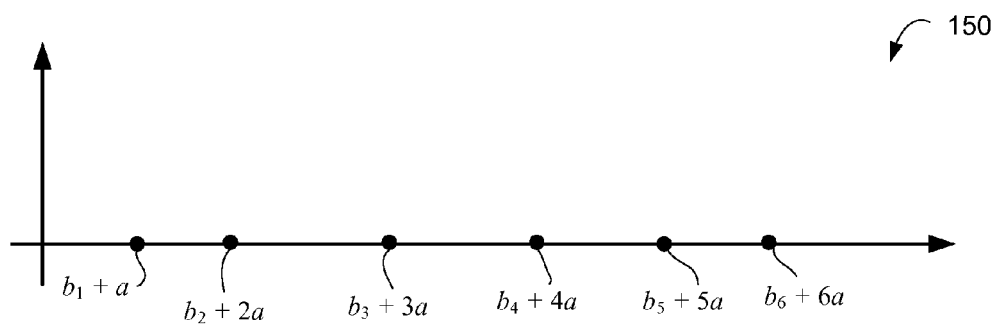
FIG. 7 shows a third example adaptive reconstruction space.

To improve on the rate-distortion performance, the present application proposes a more generic reconstruction space using the format $(i \cdot a + b_i)$. In this format, the reconstruction space is partly decoupled from the quantization step size, since a is not necessarily equal to q. As illustrated in FIG. 7, this results in a non-uniform reconstruction space 150, with complete flexibility in design. It will be noted that this format degrades to the format of $(i \cdot q + \delta_i)$ when a=q. It will also be noted that this format degrades to $i \cdot (q + \delta)$ when b=0.

It has been noted, however, that the best rate-distortion performance is achieved with $a \neq q$ and $b_i \neq 0$.

Figure 8:
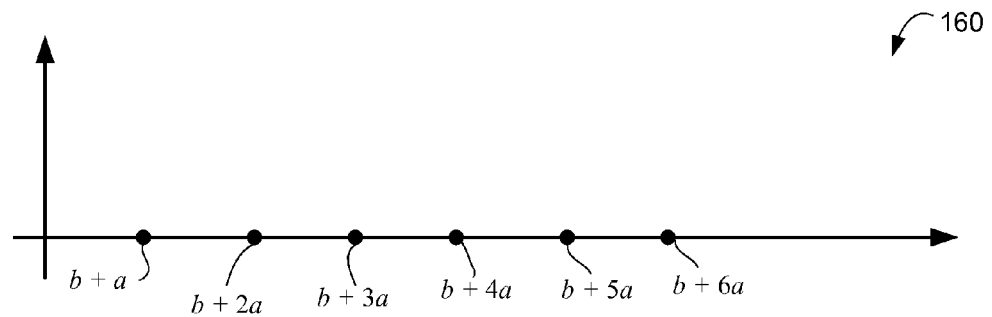
FIG. 8 shows a fourth example adaptive reconstruction space.

It has also been noted that the transmission cost of signaling $b_i$ may be unjustified from a rate-distortion point-of-view, so that the format may be simplified to the format $(i \cdot a + b)$. FIG. 8 graphically illustrates a reconstruction space 160 constructed in accordance with this format $(i \cdot a + b)$. It will be noted that the first level, e.g. i=1, is at a+b and subsequent levels (i>1) are spaced apart by a.

We can define all the samples (i.e. transform domain coefficients) that fall within the $i^{th}$ sub-part as $c^{(i)}_j$, j=1, ..., $N_i$. In this notation, the number of samples within the $i^{th}$ sub-part is $N_i$.

In an encoding process, these samples $c^{(i)}_j$ may be the data from the previous slice, frame, etc., that are then used to determine the reconstruction space for the current slice, frame, etc., if the reconstruction space is signaled at the beginning of the coefficient data, e.g. in the slice header. In one embodiment, the reconstruction space of the current slice may be based upon sample data from the immediate previous slice of the same type and/or the same quantization parameter; and the reconstruction space is signaled in the slice header. In certain cases, statistics collected in such a way may not be stable, for example, the total number of sample data may be smaller than a given threshold. In this case, some default parameters of the reconstruction space may be used. In another embodiment, the reconstruction space may be based upon sample data from the current slice or frame if the reconstruction space parameters are signaled at the end of the slice/frame data; however, this would result in a one-slice/frame delay at the decoder, which may be unacceptable in some implementations.

It will be understood that the quantized transform domain coefficients u, are the transform domain coefficients c quantized using quantization step size q, which may be denoted $q_{qP}$ below to specify the quantization step size associated with the qP value selected for the particular slice, frame, etc. Note that in some embodiments, the quantized transform domain coefficients u may also incorporate scaling; for example, in some example implementations these values may be scaled by 128 or some other factor (e.g., $2^m$, where m is the arithmetic precision in bits) to aid in facilitating efficient computational implementation. Some details of the scaling and related operations are omitted in the following description but will be understood by those ordinarily skilled in the art.

From the transform domain coefficients $c^{(i)}_j$ an average for the $i^{th}$ level may be calculated as:

$$\hat{c}^{(i)} = \frac{\left(\sum_j c^{(i)}_j\right)}{N_i} \quad (3)$$

One option for deriving the reconstruction space is to minimize the total rate-distortion using, for example, the expression:

$$\min_{a,b} \sum_i \sum_j (c^{(i)}_j - (i \cdot a + b))^2 \lambda(r_i) \quad (4)$$

In this rate-distortion expression, the distortion is given by the difference between the actual coefficients $c^{(i)}_j$ in the $i^{th}$ sub-part and the reconstruction space level given by $(i \cdot a + b)$. The rate for transmitting the reconstruction space parameters associated with signaling a and b is represented by the rate $r_i$.

A solution to Equation (4) is given by:

$$b = \frac{\left(\sum_i i \cdot \sum_j c^{(i)}_j\right) \cdot \left(\sum_i i \cdot N_i\right) - \left(\sum_i \sum_j c^{(i)}_j\right) \cdot \left(\sum_i i^2 \cdot N_i\right)}{\left(\sum_i i \cdot N_i\right)^2 - \left(\sum_i i^2 \cdot N_i\right) \cdot \left(\sum_i N_i\right)} \quad (5)$$

-continued $$a = \frac{\sum_i i \cdot \sum_j c_j^{(i)} - b \sum_i i \cdot N_i}{\sum_i i^2 \cdot N_i} \quad (6)$$

Note that the above operations could also be performed, with suitable modifications, using the (unrounded) quantized transform domain coefficients $un^{(i)}{}_j$, or in some implementations, using the quantized coefficients with fixed precision to reflect actual codec implementations, e.g., $un^{(i)}{}_j = c^{(i)}{}_j / q \cdot 128$.

The structure of the reconstruction space 160 in FIG. 8 allows for an alternative notation to be used. The alternative notation takes advantage of the fact that the first reconstruction level is distinct and all subsequent levels are at even intervals of a apart. The first level may be set as the average value for the first level, i.e. $\hat{c}^{(1)}$, which is given by Equation (3) with i=1, i.e.

$$\hat{c}^{(1)} = \frac{\left(\sum_j c_j^{(1)}\right)}{N_1}.$$

Leaving aside the scaling by $q_{qP}$ (and in some implementations by fixed values for ease of computational implementation, like 128), the first reconstruction level is given by:

$$t = \frac{\left(\sum_j un_j^{(1)}\right)}{N_1} \quad (7)$$

where $un^{(1)}{}_j = c^{(1)}{}_j / q_{qP} \cdot 128$.

Note that the transform domain coefficients quantized to the first level in this example are represented in a scaled format with a few bits arithmetic precision. The scale is by $q_{qP}$. The exemplary arithmetic precision is 7 bits, corresponding to the factor of $2^7 = 128$. Note that other arithmetic precision may also be used. The step size between subsequent quantization levels may then be denoted as s. To finds the following expression may be used:

$$s = \underset{s}{\operatorname{argmin}} \sum_{i \geq 2} \sum_j (un_j^{(i)} - i \cdot s)^2 \quad (8)$$

$$= \frac{\sum_{i \geq 2} i \cdot \sum_j un_j^{(i)}}{\sum_i i^2 \cdot N_i}$$

The reconstruction space using this notation may be written in the (i·a+b) format wherein a corresponds to s, and b corresponds to t−s. To be precise, in an implementation in which $un = c/q_{qP} \cdot 128$, then $a = s/128 \times q_{qP}$ and $b = (t-s)/128 \times q_{qP}$.

In the present application, the term "reconstruction space parameters" is used to refer to parameters that signal the adaptive reconstruction space. These parameters may include a and b, t and s, or other such parameters as may be defined for signaling the reconstruction space. Note that the reconstruction space parameters (RSP) are distinct from qP, which is used in the H.264/AVC standard to signal the quantization step size q used at the encoder. In the present application, $a \neq q$, which means that s does not result in a reconstruction space step size of $q_{qP}$ (or to be precise, using the example implementation described above, $s \neq 128$; and to be more general, $s \neq 2^m$, where m is the arithmetic precision in bits for representing s).

Nevertheless, in one example embodiment the encoder may manipulate qP to adjust the values of the RSPs that are transmitted. For example, assume the quantization step size $q_{qP}$ is to be selected from the 52 step sizes defined in H.264 and/or HEVC. In this example, the base qP is 25 (which corresponds to $q_{qP}=10$), with a 7-bit arithmetic precision for the quantized reconstruction step size parameters. If Equation (8) results in a quantized reconstruction step size parameter s of 160, it corresponds to a reconstruction step size (e.g. a) $q_s = 160/128 \cdot 10 = 12.5$. Instead of transmitting the value of s=160 to signal the reconstruction step size of $q_s = 12.5$, the encoder may adjust the qP base value from 25 to 26 (which corresponds to $q_{qP}=11$) and may then transmit a quantized reconstruction step size parameter $s=12.5/11 \cdot 128 = 145$. It should be noted that qP is already incorporated into the syntax for the bitstream as slice qP, and a smaller value for the RSPs may reduce the overhead associated with signaling these values.

Figure 9:
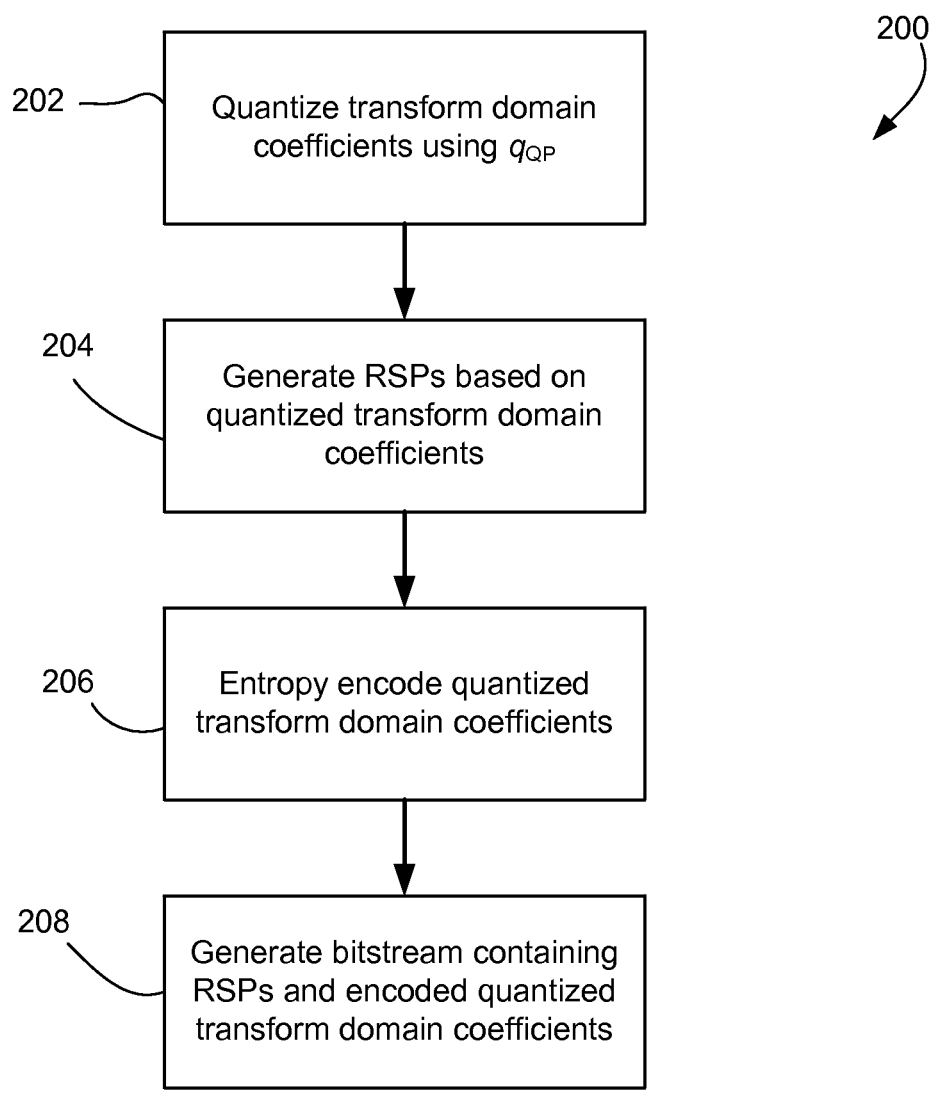
FIG. 9 shows, in flowchart form, an example method for encoding data with reconstruction space parameters.

Reference is now made to FIG. 9, which shows a flowchart of an example method 200 of encoding data. The method 200 includes an operation 202 of quantizing transform domain coefficients using the quantization step size $q_{qP}$. It will be understood that in some implementations the quantization operation is combined with the spectral transform operation and is applied to residual data to arrive at the quantized transform domain coefficients.

In operation 204, the encoder generates reconstruction space parameters (RSPs) based upon the quantized transform domain coefficients. For example, the encoder may use Equations (7) and (8), or similar equations, to generate a first level parameter $\hat{c}^{(1)}$ (represented and transmitted by t defined in (7)) and a quantized reconstruction step size parameter s. In some implementations, the RSPs may include parameters a and b, as described above. In yet other implementations, the RSPs may include other parameters, such as the first reconstruction level and the reconstruction step size.

In operation 206, the quantized transform domain coefficients are entropy encoded. The entropy encoding may be variable length coding (VLC), arithmetic coding, or any other applicable entropy encoding scheme for the specific implementation, or a combination of various entropy coding schemes/modes. The entropy encoding produces encoded data.

The method 200 then includes operation 208, in which a bitstream is generated (formed) to contain the encoded data and the RSPs. As noted previously, the RSPs may be put in a slice header, or other header location. In such an example, the RSPs are generated based upon the quantized transform domain coefficients from one frame and are then inserted in the slice header before the next frame.

Operation 208 may include encoding the RSPs for efficient transmission. Various techniques may be used to achieve transmission efficiencies. For example, various prediction schemes may be used so that the actual RSP values are not transmitted, but rather a residual value is transmitted from which the decoder can reconstruct the actual RSP value using the same prediction operation as the encoder. Quantization may be used to reduce the size of the RSP values or residual values being transmitted. It will be understood that quantization may introduce distortion in the reconstructed RSP values. Various entropy encoding mechanisms may be used to encode the RSPs for transmission. A number of possible quantization, prediction and encoding options are outlined below.

A prediction RSP, denoted $RSP_p$, may be generated based upon data known to both the encoder and decoder. For example, the prediction $RSP_p$ may be based upon previously-coded RSPs, the quantization parameter qP, data type, etc. From the difference between the calculated RSPs and the prediction $RSP_p$, a prediction error $RSP_d$ is then found. The prediction error $RSP_d$ is then quantized to form a prediction error index RSP_delta_idx, which is then entropy encoded for transmission to the decoder. At the decoder, the encoded prediction error index is extracted from the bitstream (e.g. from the slice header) and it is decoded and dequantized to create a reconstructed prediction error.

The syntax for the RSPs in these examples presumes more than one parameter. In some examples, these parameters may include the first quantized level parameter t (corresponding to $\hat{c}^{(1)}$) and the quantized reconstruction step size parameter s. An index i is used to distinguish between parameters. For example index i=1 may refer to the first quantized level parameter t and index i=2 may refer to the quantized reconstruction step size parameter s.

In some embodiments, RSPs may also be specific to a data type and a quantization parameter qP. Data types, may include luma and chroma. In some cases, the data types may specify inter-coding or intra-coding. In yet other implementations, the data types may include luma-inter, luma-intra, chroma-inter, and chroma-intra. Accordingly, the format for specifying a parameter may be given by:

RSP[qP][DataType][i]

Using this format, the process for encoding an RSP with index i, quantization parameter qP, and data type DataType is as follows:

---

$RSP_d$[qP][DataType][i] = RSP[qP][DataType][i] − $RSP_p$[qP][DataType][i]
RSP_delta_idx[qP][DataType][i] = Q($RSP_d$[qP][DataType][i])

---

The element RSP_delta_idx[qP][DataType][i] specifies the quantization index that is obtained by quantizing the RSP prediction error $RSP_d$. Note that this quantization operation Q(•) does not necessarily involve the same quantization step size as qP. The element RSP_delta_idx is entropy coded and transmitted in the bitstream.

At the decoder, RSP is reconstructed from the corresponding received RSP_delta_idx as follows:

---

RSP'[qP][DataType][i] = invQ( RSP_delta_idx[qP][DataType][i] ) + $RSP_p$[qP][DataType][i]                                   (9)

---

Where RSP' denotes the reconstruction of RSP parameter, and invQ(•) denotes the inverse quantization function.

Note that in some embodiments, the resulting RSP'[qP][DataType][i] may be clipped to prevent its value from exceeding some predefined reasonable range. For example, if RSP'[qP][DataType][1]<RSP'[qP][DataType][2], RSP'[qP][DataType] [1] may be set to be equal to RSP'[qP][DataType][2] so that the first cell of the resulting quantizer is always no less than the second cell. It has been observed that such a reconstruction space structure may provide improved performance.

There are a number of possible ways to arrive at the prediction $RSP_p$[qP][DataType][i]. One is to use a fixed default prediction value. The default value may be dependent upon qP, DataType, and/or index i. It may also be dependent upon temporal layer of slice and other factors. An sample default value is described below for the two index example:

$RSP_p$[qP][RSP_TYPE_INTRAY][1]=128
$RSP_p$[qP][RSP_TYPE_INTRAY][2]=128
$RSP_p$[qP][RSP_TYPE_INTRAUV][1]=128
$RSP_p$[qP][RSP_TYPE_INTRAUV][2]=128
$RSP_p$[qP][RSP_TYPE_INTERY][1]=128, if slice temporal layer index≤1
$RSP_p$[qP][RSP_TYPE_INTERY][2]=147, if slice temporal layer of slice>1
$RSP_p$[qP][RSP_TYPE_INTERUV][1]=128 if slice temporal layer index≤1
$RSP_p$[qP][RSP_TYPE_INTERUV][2]=147, if slice temporal layer index>1

The sample default value may also be independent of qP, DataType, and/or index i. An sample default value is described below:

$RSP_p$[qP][RSP_TYPE_INTRAY][i]=128
$RSP_p$[qP][RSP_TYPE_INTRAUV][i]=128
$RSP_p$[qP][RSP_TYPE_INTERY][i]=128
$RSP_p$[qP][RSP_TYPE_INTERUV][i]=128

In another embodiment, the prediction may be derived from previously-coded RSP values. For example, the prediction may be based upon the most recently coded RSP parameter having the same qP and DataType in the current slice. In the two index example, this means one of the RSP parameters serves as the prediction for the other RSP parameter. As an example:

$RSP_p$[qP][DataType][i]=RSP'[qP][DataType][i+1],
  where RSP'[qP][DataType][i+1] is obtained prior to reconstructing RSP'[qP][DataType][i].

As with the prediction process, there are a number of possible quantization schemes for the RSP values that may be used in various embodiments. In a first example embodiment, uniform quantization may be used. That is, using a given quantization step size $q_{RSP}$, the forward and inverse quantization of the prediction error $RSP_d$ is given by:

RSP_delta_idx=Q($RSP_d$)=sign($RSP_d$)·round(abs($RSP_d$)/$q_{RSP}$+f), and $RSP_d'$=invQ(RSP_delta_idx)=RSP_delta_idx·$q_{RSP}$, where 1>f>0 is a rounding offset The dequantized prediction error is denoted $RSP_d'$.

In another example embodiment, it has been observed that large RSP are generally preferable in achieving better overall coding performance. Accordingly, in this embodiment the quantization may use a ceiling function.

RSP_delta_idx=Q($RSP_d$)=ceil($RSP_d$/$q_{RSP}$)
$RSP_d'$=invQ(RSP_delta_idx)=RSP_delta_idx·$q_{RSP}$ In yet a further embodiment, the following quantization scheme may be used:

RSP_delta_idx=Q($RSP_d$)=floor($RSP_d$/$q_{RSP}$)
$RSP_d'$=invQ(RSP_delta_idx)=(RSP_delta_idx+1)·$q_{RSP}$ In the following illustrative example, RSPd[qP][DataType][1] is first clipped to (−31, 32) and then quantized with a quantization step size of $q_{RSP}$=8:

RSP_delta_idx[qP][DataType][1]=(Clip3(−31, 32, $RSP_d$[qp][DataType][1])+31)>>3
$RSP_d'$[qP][DataType][1]=((RSP_delta_idx[qP][DataType][1]+1)<<3)−31

In the following illustrative example, RSPd[qP][DataType][2] is first clipped to (−31, 32) and then quantized with a quantization step size of $q_{RSP}$=4:

RSP_delta_idx[qP][DataType][2]=(Clip3(−31, 32, $RSP_d$[qP][DataType][2])+31)<<2
$RSP_d'$[qP][DataType][2]=((RSP_delta_idx[qP][DataType][2]+1)>>2)−31

Non-uniform quantizers may also be used in some embodiments. In some example implementations, a non-uniform quantizer may be dynamically developed based upon the statistics for $RSP_d$.

As the encoding process continues, the statistics for the prediction error of RSP may vary. It may therefore be beneficial to make the quantization adaptive. One example of adaptive quantization is to select between two or more uniform quantizers based on the value of RSPs received from the previous slice. For example, the encoder (and decoder) may denote Q1(•) and invQ1(•) as a pair of forward and inverse uniform quantizers with quantization steps size $q_{RSP}$=q1 and rounding offset f=½. Denote Q2(•) and invQ2 (•) as a pair of forward and inverse uniform quantizers with quantization steps size $q_{RSP}$=q2 and rounding offset f=½. Denote $RSP'_{pre}$ as the reconstruction of RSP for the previous slice. Given two thresholds, Th1 and Th2, the forward quantization of $RSP_d$ is as follows:

RSP_delta_idx=Q($RSP_d$)=sign($RSP_d$)·round(abs($RSP_d$)/q1+f), for $RSP'_{pre}$<Th2 and $RSP'_{pre}$>Th1;

RSP_delta_idx=Q($RSP_d$)=sign($RSP_d$)·round(abs($RSP_d$)/q2+f), otherwise

The inverse quantization in this example is given by:

$RSP_d'$=invQ(RSP_delta_idx)=RSP_delta_idx·q1, for $RSP'_{pre}$<Th2 and $RSP'_{pre}$>Th1;

$RSP_d'$=invQ(RSP_delta_idx)=RSP_delta_idx·q2, otherwise

In this example, it will be appreciated that the quantization is based upon the RSP value from the previous slice. If inter-slice dependency is not permitted, then this example quantization scheme may be modified by the prediction scheme described above in which the prediction is derived based on the coded RSP values from the current slice. In this case, the $RSP'_{pre}$ will be the RSP already received for the current slice.

The quantized prediction values may be entropy coded in any suitable manner. Example entropy coding schemes that may be used in specific implementations include fixed-length coding, a Golumb-Rice code (for example, based upon the probability distribution of the indices), and a Huffman code (for example, designed based upon the probability distribution of the indices).

The RSP parameters, howsoever they are predicted, quantized and encoded (if at all), are transmitted to the decoder as part of the bitstream. In many embodiments, the encoded parameters may be inserted into a header, such as the slice header. The slice header syntax may specify a function, such as RSP_param( ), for the RSP parameters. An example slice header syntax is given below:

| RSP_param( ) { | Descriptor |
|---|---|
| RSP_slice_flag | u(1) |
| If(RSP_slice_flag) | |
| { | |
| RSP_interY_flag | u(1) |
| if (RSP_interY_flag) | |
| { | |
| read_RSP_data(RSP_TYPE_INTERY) | |
| } | |
| RSP_interUV_flag | u(1) |
| if (RSP_interUV_flag) | |
| { | |
| read_RSP_data(RSP_TYPE_INTERUV) | |
| } | |

-continued

| RSP_param( ) { | Descriptor |
|---|---|
| RSP_intraY_flag | u(1) |
| if(RSP_intraY_flag) | |
| { | |
| read_RSP_data (RSP_TYPE_INTRAY); | |
| } | |
| RSP_intraUV_flag | u(1) |
| if(RSP_intraUV_flag) | |
| { | |
| read_RSP_data (RSP_TYPE_INTRAUV) | |
| } | |
| } | |
| read_RSP_data (RSP_data_type_id){ | |
| for(i=1 ; i<=2;i++){ | |
| RSP_delta_idx[slice_qp][ RSP_data_type_id][i] | vlc(v) |
| } | |
| } | |

The association between RSP_data_type_id and the data type names may, in one example, be:

| RSP_data_type_id | Data type |
|---|---|
| 0 | RSP_TYPE_INTERY |
| 1 | RSP_TYPE_INTERUV |
| 2 | RSP_TYPE_INTRAY |
| 3 | RSP_TYPE_INTRAUV |

In the above, RSP_TYPE_INTERY corresponds to Inter-coded luma data, RSP_TYPE_INTERUV corresponds to Inter-coded chroma data; RSP_TYPE_INTRAY corresponds to Intra-coded luma data; and RSP_TYPE_INTRAUV corresponds to Intra-coded chroma data.

An alternative syntax, in which the transmission of RSP parameters for Chroma (UV) components is dependent upon whether RSP parameters for Luma (Y) components are present, is set out below:

| RSP_param( ) { | Descriptor |
|---|---|
| RSP_slice_flag | u(1) |
| If(RSP_slice_flag) | |
| { | |
| RSP_interY_flag | u(1) |
| if (RSP_interY_flag) | |
| { | |
| read_RSP_data(RSP_TYPE_INTERY) | |
| RSP_interUV_flag | u(1) |
| if (RSP_interUV_flag) | |
| { | |
| read_RSP_data(RSP_TYPE_INTERUV) | |
| } | |
| } | u(1) |
| RSP_intraY_flag | u(1) |
| if(RSP_intraY_flag) | |
| { | |
| read_RSP_data (RSP_TYPE_INTRAY); | |
| RSP_intraUV_flag | u(1) |
| if(RSP_intraUV_flag) | |
| { | |
| read_RSP_data (RSP_TYPE_INTRAUV) | |
| } | |
| } | |
| } | |
| read_RSP_data (RSP_data_type_id){ | |
| for(i=1; i<=2;i++){ | |
| RSP_delta_idx[slice_qp][ RSP_data_type_id][i] | vlc(v) |
| } | |
| } | |

In some example implementations, it may sometimes be advantageous to allow different RSP parameters to be used for U and V components, separately. For example, the RSP_TYPE_INTRAUV data type may be replaced by two data types RSP_TYPE_INTRAU and RSP_TYPE_IN-TRAV. A set of RSP indices will then be transmitted if the corresponding RSP_intraU_flag or RSP_intraV_flag is true.

At the decoder, the RSP_delta_idx values are extracted from the bitstream in accordance with the applicable syntax. Using one of the processed described above, the decoder reconstructs the RSP' values using the applicable prediction and inverse quantization process.

The entropy encoded quantized transform domain coefficients are decoded from the bitstream. The decoder the converts the quantized transform domain coefficients to reconstructed transform coefficients by dequantizing them using the reconstructed RSP' parameters. In the following description of the decoder coefficient reconstruction process, the notation RSP' for reconstructed RSP values is not used; instead for simplicity the notation RSP is used. The reconstructed RSP values continued to be specified using the syntax: RSP[qP][DataType][i].

For the purposes of this example, the RSP parameters are assumed to be the first reconstruction level parameter t and the reconstruction step size parameter s. The index i=1 specifies the first quantized level parameter t and the index i=2 specifies the quantized reconstruction step size parameter s.

Specifically, the semantics definition of the two RSP parameters are:

RSP[slice_qP][RSP_data_type_id][1]: This RSP parameter determines the first reconstruction level for the decoder as denoted by t. Based on a given quantization parameter qP corresponding to a given quantization step size $q_{qP}$ for the current slice, the reconstruction level determined by RSP [slice_qP][RSP_data_type_id][1] can be calculated as $t/128*q_{qP}$, when 7-bit arithmetic precision is used for this parameter t.

RSP[slice_qP][RSP_data_type_id][2]: This parameter determines reconstruction levels other than the first one. It may be called a reconstruction step size, as denoted by s, meaning a reconstruction step size that is to be added to t to determine reconstruction levels other than the first one. For example, the second reconstruction level corresponds to t+s, and can be calculated as $(t+s)/128*q_{qP}$, when 7-bit arithmetic precision is used for both parameters s and t.

The entropy decoded indices (i.e. the quantized transform domain coefficients u) are given by $u_{ij}$. When the RSP parameters are used as specified in the slice header syntax, the reconstructed transform domain coefficients $d_{ij}$ are thus generated by the decoder in accordance with:

$$d_{ij}=(u_{ij} \times Fa+Fb)>>Fc; \quad (10)$$

where,

Fa=LevelScale$_{(nS) \times (nS)}$[qP%6][i][j]×RSP[slice_qP][RSP_data_type_id][2];

Fb=(RSP[slice_qP][RSP_data_type_id][1]−RSP[slice_qP][RSP_data_type_id][2])×LevelScale$_{(nS) \times (nS)}$[qP%6][i][j]+iAdd;

Fc=iShift+7

It will be understood that LevelScale$_{(nS) \times (nS)}$[qP %6][i][j] is a scaling operation currently found in the H.264/AVC and H.265/HEVC reconstruction process, as will be understood by those ordinarily skilled in the art.

In some embodiments, the two RSP parameters might exclude some special cases when RSP_slice_flag is set. In these cases, the semantics definition of the two RSP parameters are:

RSP[slice_qP][RSP_data_type_id][1]: This parameter determines the first reconstruction level for the decoder for coding units corresponding to RSP_data_type_id, and is an integer number between (3<<(RSP_PARAM_PRECISION-2)) and (5<<(RSP_PARAM_PRECISION-2)) inclusive, where RSP_PARAM_PRECISION is the precision used to represent the RSP parameters, which is no less than 2. When the parameter RSP_delta_idx[slice_qP][RSP_data_type_id][1] is read from the slice header as specified in the slice header syntax above, RSP[slice_qP][RSP_data_type_id][1] (or equivalently RSP'[slice_qP][RSP_data_type_id][1], as explained above) is derived as described in connection with Equation (9), which should not be equal to the corresponding parameter RSP[slice_qP][RSP_data_type_id][2] (see the definition below). When the parameter RSP_delta_idx[slice_qP][RSP_data_type_id][1] is not read from the slice header (for example, when RSP_slice_flag or the corresponding RSP_data_type_flag is not set), RSP[slice_qP][RSP_data_type_id][1] is set to be a default value of (1<<RSP_PARAM_PRECISION).

RSP[slice_qP][RSP_data_type_id][2]: This parameter determines reconstruction levels other than the first one, and is an integer number between (3<<(RSP_PARAM_PRECISION-2)) and (5<<(RSP_PARAM_PRECISION-2)) inclusive. It may be called a reconstruction step size meaning a reconstruction step size that is to be added to the first reconstruction level to determine the second and above reconstruction levels. When the parameter RSP_delta_idx[slice_qP][RSP_data_type_id][2] is read from the slice header as specified in the slice header syntax above, RSP[slice_qP][RSP_data_type_id][2] (or equivalently RSP'[slice_qP][RSP_data_type_id][2], as explained above) is derived as described in connection with Equation (9), which should not be equal to (1<<RSP_PARAM_PRECISION). When the parameter RSP_delta_idx[slice_qP][RSP_data_type_id][2] is not read from the slice header (for example, when RSP_slice_flag or the corresponding RSP_data_type_flag is not set), RSP[slice_qP][RSP_data_type_id][2] is set to be a default value of (1<<RSP_PARAM_PRECISION).

In yet another embodiment, the scaling operation may further involve a factor LevelScalePerPred$_{(nS) \times (nS)}$[I][j], where LevelScalePerPred$_{(nS) \times (nS)}$ is a size (nS)x(nS) matrix. That is, Fa=LevelScale$_{(nS) \times (nS)[zP\%6]}$[i][j]×LevelScalePerPred$_{(nS) \times (nS)}$[i][j]×RSP[slice_qP][RSP_data_type_id][2];

The factor LevelScalePerPred$_{(nS) \times (nS)}$[i][j] is determined from the transform coefficient of the prediction samples p at position (i,j) corresponding to the quantized transform coefficient $u_{ij}$. Such scaling may improve visual quality of the reconstructed samples as it is dependent upon the energy distribution of p in the transform domain. For example, LevelScalePerPred$_{(nS) \times (nS)}$[i][j] may be inverse proportional to the energy of the prediction p in the transform domain multiplied by a value dependent upon the average prediction energy of the frame, the slice, or a defined group of coding units.

Figure 10:
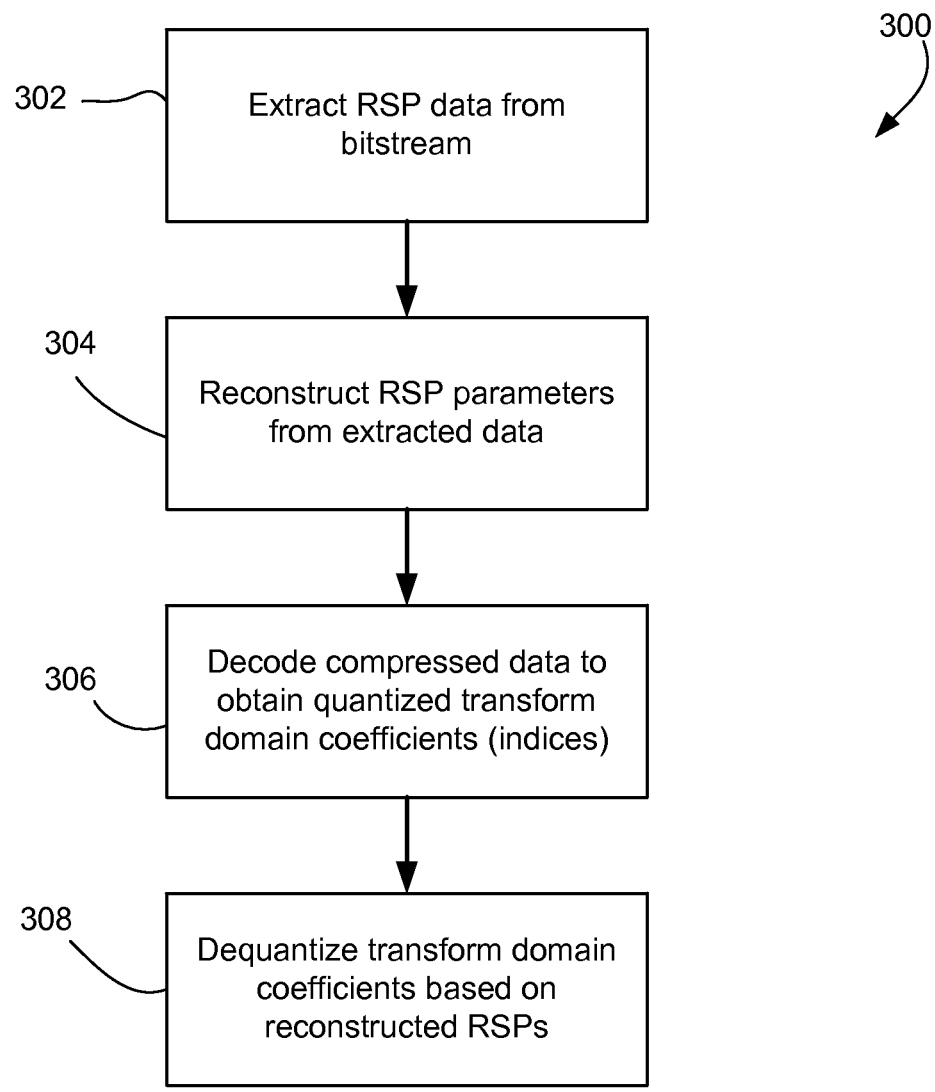
FIG. 10 shows, in flowchart form, an example method for decoding encoded data using reconstruction space parameters.

Reference is now made to FIG. 10, which shows, in flowchart form, and example method 300 for decoding a bitstream of compressed data.

In operation 302, the decoder extracts RSP data from the bitstream. In a broad sense, the RSP parameters are extracted from the bitstream; although, it will be understood that the parameters may be predicted, quantized, and encoded before being inserted in the bitstream. As a result, in operation 304 the decoder reconstructs the RSP parameters from the RSP data extracted in operation 302, if needed. From the foregoing description, it will be understood that the RSP parameter may, in some embodiments, include the first quantized level parameter t and the quantized reconstruction step size parameter s. Other parameters may be used in other embodiments. It will also be appreciated that a single set of RSP parameters may be provided for all components, or separate RSP parameters for Luma and Chroma components, or separate RSP parameters for inter-coded data and intra-coded data, or separate RSP parameters for Luma-intra data, Luma-inter data, Chroma-intra data, and Chroma-inter data. Further permutations will be understood in light of the foregoing description of example embodiments.

It will also be understood that the RSP data may be referred to or labeled as one or more "syntax elements" within a raw byte sequence payload (RBSP). The RBSP is a syntax structure containing an integer number of bytes encapsulated in a Network Abstraction Layer (NAL) unit, wherein a NAL unit may contain a data type indication and one or more RBSPs. Other structures for the data in the bitstream and, in particular, the encapsulation of the RSP data within various data structures in the bitstream, are also contemplated. It will be appreciated that operation 302 may include extracting the RSP data from the NAL unit and/or RBSP and/or other data structures in the bitstream.

In operation 306, the decoder decodes the compressed data to recover the quantized transform coefficients $u_{ij}$ (i.e. the indices). In operation 308, the decoder reconstructs the transform coefficients using the reconstructed RSP parameters. In one example implementation the decoder uses a process like that described in connection with Equation (9).

In another embodiment, the reconstructed transform domain coefficients $d_{ij}$ may be generated by the decoder in accordance with:

$$d_{ij}=sgn(u_{ij})\times(abs(u_{ij})\times Fa+Fb)>>Fc;$$

where,

Fa=LevelScale$_{(nS)\times(nS)}$[qP%6][i][j]×RSP[slice_qP][RSP_data_type_id][2];

Fb=(RSP[slice_qP][RSP_data_type_id][1]−RSP[slice_qP][RSP_data_type_id][2])×LevelScale$_{(nS)\times(nS)}$[qP%6][i][j]+Add;

Fc=iShift+7 where sgn( ) is a sign function and abs( ) returns the absolute value of its input. Note that LevelScale$_{(nS)\times(nS)}$[qP %6][i][j] may be degraded to LevelScale$_{(nS)\times(nS)}$[qP %6], which is independent of the indices of i and j.

In another embodiment, the reconstructed transform domain coefficients $d_{ij}$ may be generated by the decoder in accordance with:

if($u_{ij}>0$)

$$d_{ij}=(u_{ij}\times Fa+Fb)>>Fc;$$

else if ($u_{ij}$=0) $d_{ij}$=0;

else $d_{ij}=(u_{ij}\times Fa+Fb')>>Fc$;

where Fb'=(RSP[slice_qP] [RSP_data_type_id] [2]−RSP[slice_qP] [RSP_data_type_id] [1])×LevelScale$_{(nS)\times(nS)}$[qP%6] [i] [j]+iAdd;

It will be understood that, in some embodiments, the inverse-quantization and inverse-transform processes may be mathematically performed together. Accordingly, the output of the overall process may be reconstructed residuals (e.g. inverse-quantized inverse-transformed coefficients).

Simplification One

The mapping between qP and the 52 quantization step sizes in H.264/AVC and the current HEVC development is given by:

Double $q_{QP}$[52]={0.625, 0.6875, 0.8125, 0.875,
 1.000, 1.125, 1.250, 1.375, 1.625, 1.750, 2.000,
 2.250, 2.500, 2.7500,3.250, 3.500, 4.000, 4.500,
 5.000, 5.500, 6.500, 7.000, 8.000, 9.000,
 10.000, 11.000, 13.000, 14.0000, 16.000,
 18.000, 20.000, 22.000, 26.000, 28.000, 32.000,
 36.000, 40.000, 44.000, 52.000, 56.000, 64.000,
 72.0000, 80.000, 88.000, 104.000, 112.000,
 128.000, 144.000, 160.000, 176.000, 208.000,
 224.0000};

One possible simplification of the above-described processes is to determine at the encoder the new quantized reconstruction step size s, and round it to a near step size from the existing set of 52 $q_{QP}$ step sizes. For example, s may be computed as:

$$s = \underset{s}{\mathrm{argmin}} \sum_{i\geq 1} \sum_j (un_j^{(i)} - i\cdot s)^2 \quad (11)$$

$$= \frac{\sum_{i\geq 1} i \cdot \sum_j un_j^{(i)}}{\sum_i i^2 \cdot N_i}$$

Note that this is the same as Equation (3), but ranges over i≥1. The desired reconstruction step size $q_{next}$ for may then be calculated by $$q_{next}=S/128\cdot q_{QP}[qP_{used}]$$

Where used is $qP_{used}$ is the current qP for the slice, so $q_{QP}$ gives the quantization step size actually used in the current slice for quantizing transform domain coefficients. The reconstruction $qP_{next}$ may be found by mapping the desired reconstruction step size $q_{next}$ back to a quantization parameter using the q array as follows:

```
for(Int v=0; v<52; v++)
{
    if(q_next< (q[v] + q[v+1])/2)
    {
        qP_next = Clip3(qP_used − 3, qP_used + 3, v);
        break;
    }
}
```

When only one next is $qP_{next}$ is transmitted for one slice, it can be transmitted without changing any syntax of the current HEVC. However, as the statistics for Luma and Chroma components are very different from each other, some extra gain may be achieved if Equation (11) is computed for different type of data such as Luma and Chroma, and a corresponding $qP_{next}$ is transmitted to be used by Luma and Chroma.

Simplification Two

In another example, the RSPs for the Luma and Chroma components are represented by the corresponding Luma and Chroma quantization parameters (qP): $qP_Y$ and $qP_{UV}$, respectively. In the current slice header described in HEVC, the syntax element slice_qp_delta is transmitted to specify an initial value of $qP_Y$. Accordingly, the syntax may be modified to provide for syntax element slice_chroma_qp_delta to be transmitted in the slice header, which is used to specify an initial value of $QP_{UV}$.

The syntax element slice_chroma_qp_delta in this example specifies the initial value of $qP_{UV}$ to be used for all the macroblocks in the slice until modified by the value of cu_qp_delta in the coding unit layer. The initial $qP_{UV}$ quantization parameter for the slice may be computed as:

$$SliceQP_C = SliceQP_Y + slice\_chroma\_qp\_delta$$

The value of slice_chroma_qp_delta may be limited such that $SliceQP_C$ is in the range of $-QpBdOffset_C$ to $+51$, inclusive.

The value of $qP_{UV}$ may derived as $$QP_C = (((QP_{C,PRED} + cu\_qp\_delta + 52 + 2*QpBdOffset_C) \% (52 + QpBdOffset_C)) - QpBdOffset_C$$

where $QP_{C,PRED}$ is a prediction value of the chroma quantization parameter $QP_C$, which may be derived from the luma or chroma quantization parameters of previously-decoded coding units in the current slice or previous slices. In one example, $QP_{C,PRED}$ may be derived as the chroma quantization parameter of the left neighbor quantization group of coding units in the current slice. If the left neighbor quantization group in the current slice is not available, $QP_{C,PRED}$ may be derived as the chroma quantization parameter, of the previous quantization group in decoding order in the current slice. For the first quantization group of coding units in the slice $QP_{C,PRED}$ may be initially set equal to $SliceQP_C$ at the start of each slice.

The value of $QP'_C$ may be derived as $QP'_C = QP_C + QpBdOffset_C$.

Figure 11:
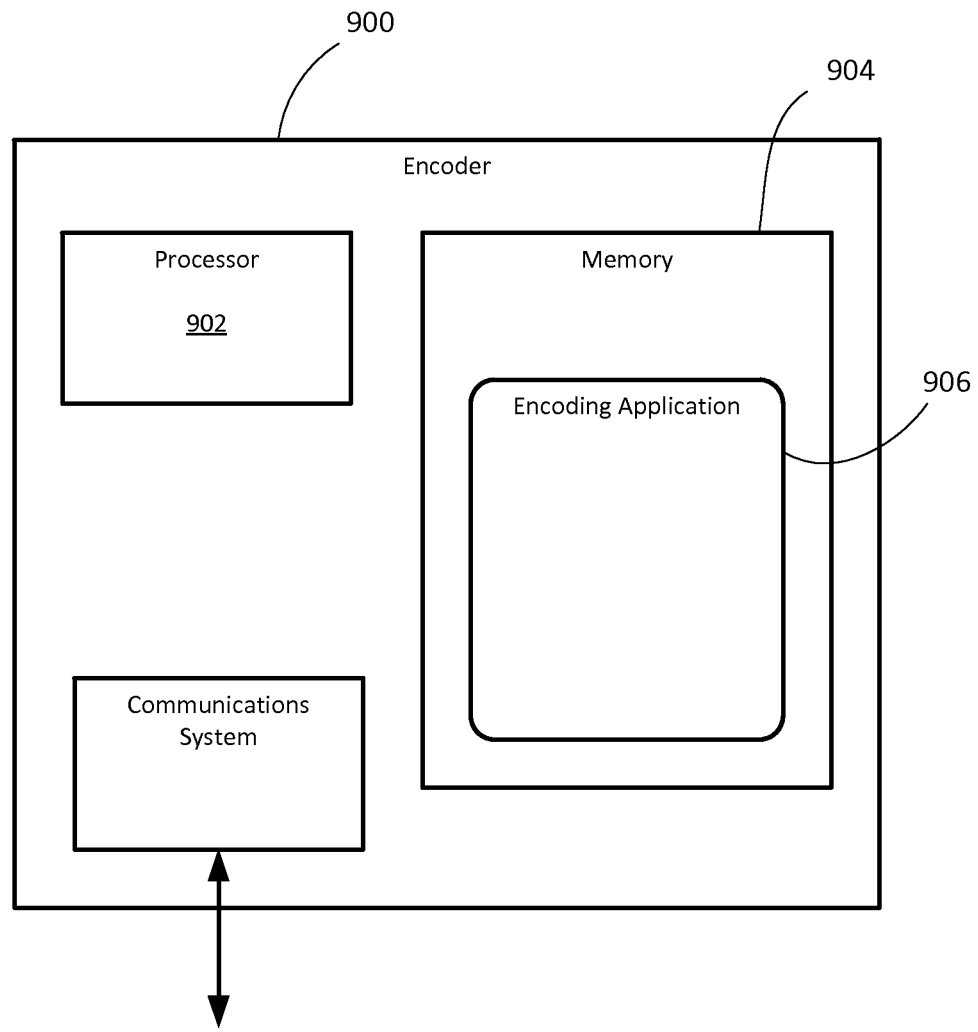
FIG. 11 shows a simplified block diagram of an example embodiment of an encoder.

Reference is now made to FIG. 11, which shows a simplified block diagram of an example embodiment of an encoder 900. The encoder 900 includes a processor 902, memory 904, and an encoding application 906. The encoding application 906 may include a computer program or application stored in memory 904 and containing instructions for configuring the processor 902 to perform steps or operations such as those described herein. For example, the encoding application 906 may encode and output bitstreams encoded in accordance with the adaptive reconstruction level process described herein. The input data points may relate to audio, images, video, or other data that may be subject of a lossy data compression scheme. The encoding application 906 may include a quantization module 908 configured to determine an adaptive reconstruction level for each index of a partition structure. The encoding application 906 may include an entropy encoder configured to entropy encode the adaptive reconstruction levels or RSP data, and other data. It will be understood that the encoding application 906 may be stored in on a computer readable medium, such as a compact disc, flash memory device, random access memory, hard drive, etc.

Figure 12:
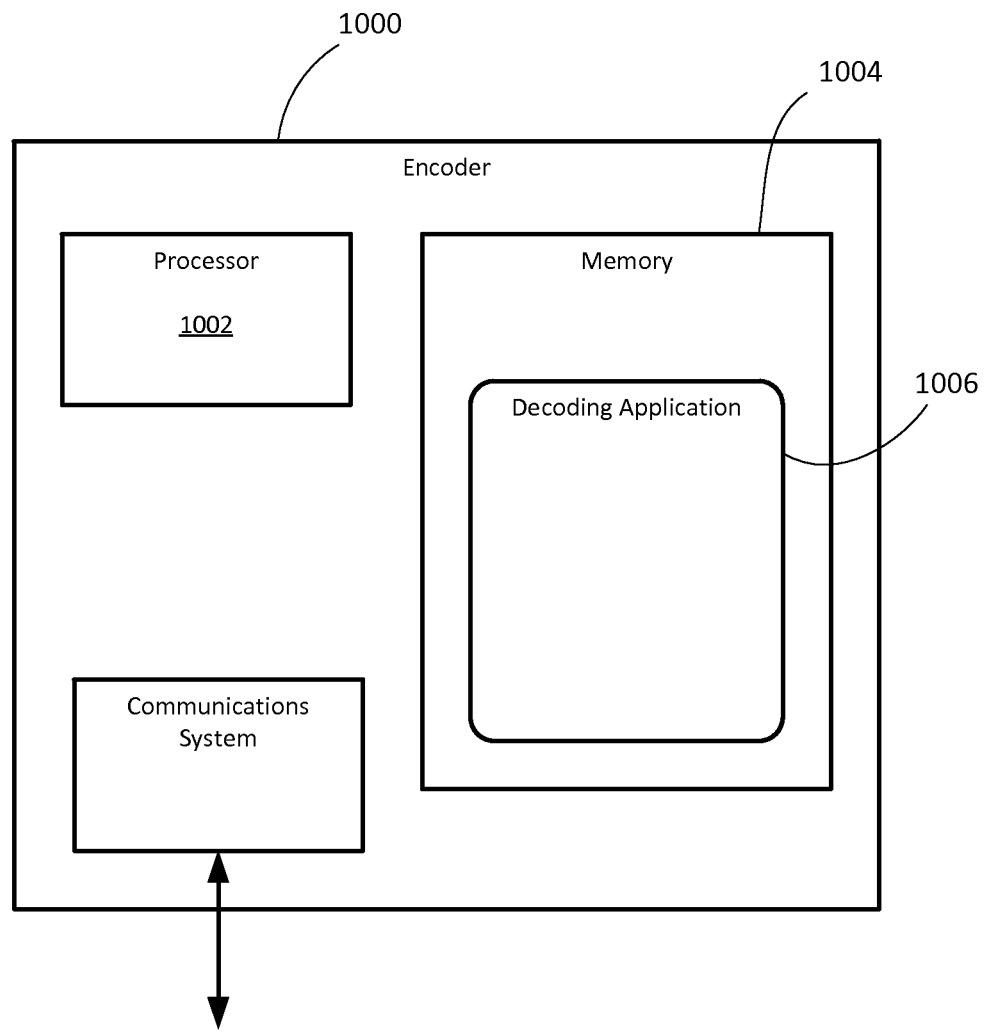
FIG. 12 shows a simplified block diagram of an example embodiment of a decoder.

Reference is now also made to FIG. 12, which shows a simplified block diagram of an example embodiment of a decoder 1000. The decoder 1000 includes a processor 1002, a memory 1004, and a decoding application 1006. The decoding application 1006 may include a computer program or application stored in memory 1004 and containing instructions for configuring the processor 1002 to perform steps or operations such as those described herein. The decoding application 1006 may include an entropy decoder and a dequantization module 1010 configured to obtain RSP data or adaptive reconstruction levels and use that obtained data to reconstruct transform domain coefficients or other such data points. It will be understood that the decoding application 1006 may be stored in on a computer readable medium, such as a compact disc, flash memory device, random access memory, hard drive, etc.

It will be appreciated that the decoder and/or encoder according to the present application may be implemented in a number of computing devices, including, without limitation, servers, suitably programmed general purpose computers, audio/video encoding and playback devices, set-top television boxes, television broadcast equipment, and mobile devices. The decoder or encoder may be implemented by way of software containing instructions for configuring a processor to carry out the functions described herein. The software instructions may be stored on any suitable non-transitory computer-readable memory, including CDs, RAM, ROM, Flash memory, etc.

It will be understood that the encoder described herein and the module, routine, process, thread, or other software component implementing the described method/process for configuring the encoder may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

Computer Program Listing Appendix

By way of example, and without limitation, the accompanying ASCII text file entitled 43140-US-PAT_code_listing.txt contains example code subroutines and/or listings providing example implementations of various operations. The content of the ASCII text file is hereby incorporated by reference. Specific routines found in the text file include:

1. RSP computation: routines for determining the RSPs for a slice based on data from the previous slice;
2. Applying the new level to deQ: dequantization with the adaptive reconstruction levels
3. Data Collection: a reconstruction level data collection routine;
4. RSP transmitting: routine for coding RSP data in the slice header; and
5. RSP receiving: routing for decoding RSP data from the slice header.

It will be appreciated that these example routines and code listings are examples of portions of the code listing used in implementing and encoder and/or decoder in accordance with one embodiment of the present application, and are not a complete processor-executable code listing for either an encoder or decoder.

What is claimed is:

1. A method for encoding video data by adjusting a quantization parameter, the video data being partitioned into blocks comprising sets of quantized transform coefficients, the method comprising:
   for a set of quantized transform coefficients corresponding to one of the blocks, collecting statistics, wherein the statistics comprise the number of quantized transform coefficients and the sum of the non-rounded quantization values of the quantized transform coefficients in the set;
   deriving a step size based on the statistics, wherein the step size is derived based on the number of quantized transform coefficients and the sum of the non-rounded quantization values of the quantized transform coefficients in the set;
   mapping the derived step size to a closest quantization parameter value; and quantizing a next block using the mapped quantization parameter value.

2. The method of claim 1 wherein the block and the next block are either coding units or slices.

3. The method of claim 1 wherein the collecting statistics is performed at each quantization level for each set of coefficients.

4. The method of claim 1 wherein the mapping further comprises determining a delta between the mapped quantization parameter and a previous quantization parameter that was used for quantizing the coefficients in the block.

5. The method of claim 1 wherein the collecting further comprises collectively summing the non-rounded quantization values and the number of the quantized transform coefficients falling into quantization levels above a given threshold.

6. A non-transitory processor-readable medium storing processor-executable instructions which, when executed, cause the processor to perform the method claimed in claim 1.

7. The non-transitory processor-readable medium of claim 6 wherein the block and the next block are either coding units or slices.

8. The non-transitory processor-readable medium of claim 6 wherein the collecting statistics is performed at each quantization level for each set of coefficients.

9. The non-transitory processor-readable medium of claim 6 wherein the mapping further comprises determining a delta between the mapped quantization parameter and a previous quantization parameter that was used for quantizing the coefficients in the block.

10. The non-transitory processor-readable medium of claim 6 wherein the collecting further comprises collectively summing the non-rounded quantization values and the number of the quantized transform coefficients falling into quantization levels above a given threshold.

11. An encoder for encoding video data by adjusting a quantization parameter, the video data being partitioned into blocks comprising sets of quantized transform coefficients, the encoder comprising:
 a processor;
 a memory;
 an encoding application stored in memory and executable by the processor, and containing instruction which, when executed, cause the processor to
  for a set of quantized transform coefficients corresponding to one of the blocks, collect statistics, wherein the statistics comprise the number of quantized transform coefficients and the sum of the non-rounded quantization values of the quantized transform coefficients in the set;
  derive a step size based on the statistics, wherein the step size is derived based on the number of quantized transform coefficients and the sum of the non-rounded quantization values of the quantized transform coefficients in the set;
  map the derived step size to a closest quantization parameter value; and
  quantize a next block using the mapped quantization parameter value.

12. The encoder of claim 11 wherein the block and the next block are either coding units or slices.

13. The encoder of claim 11 wherein collecting statistics is performed at each quantization level for each set of coefficients.

14. The encoder of claim 11 wherein mapping further comprises determining a delta between the mapped quantization parameter and a previous quantization parameter that was used for quantizing the coefficients in the block.

15. The encoder of claim 11 wherein collecting further comprises collectively summing the non-rounded quantization values and the number of the quantized transform coefficients falling into quantization levels above a given threshold.

* * * * *